July 18, 1939.　　　　J. VEHKO　　　　2,166,226
METHOD OF PRODUCING STAMPINGS
Filed March 11, 1936　　　3 Sheets-Sheet 2
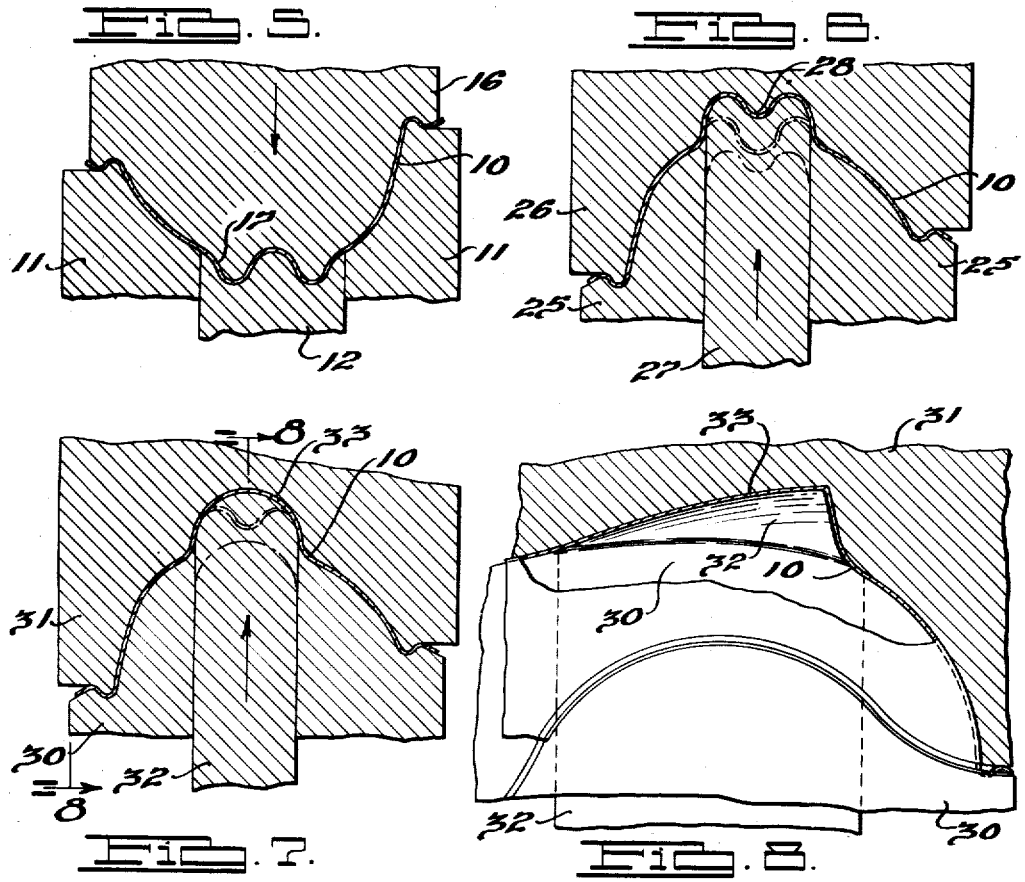
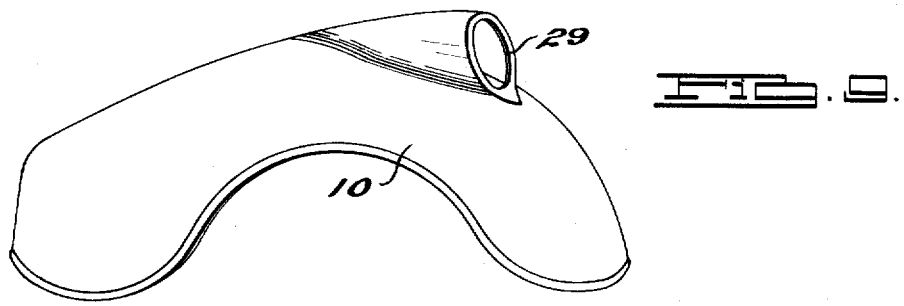
INVENTOR
*James Vehko.*
BY
*Barnes, Dickey Pierce + Hann.*
ATTORNEYS.

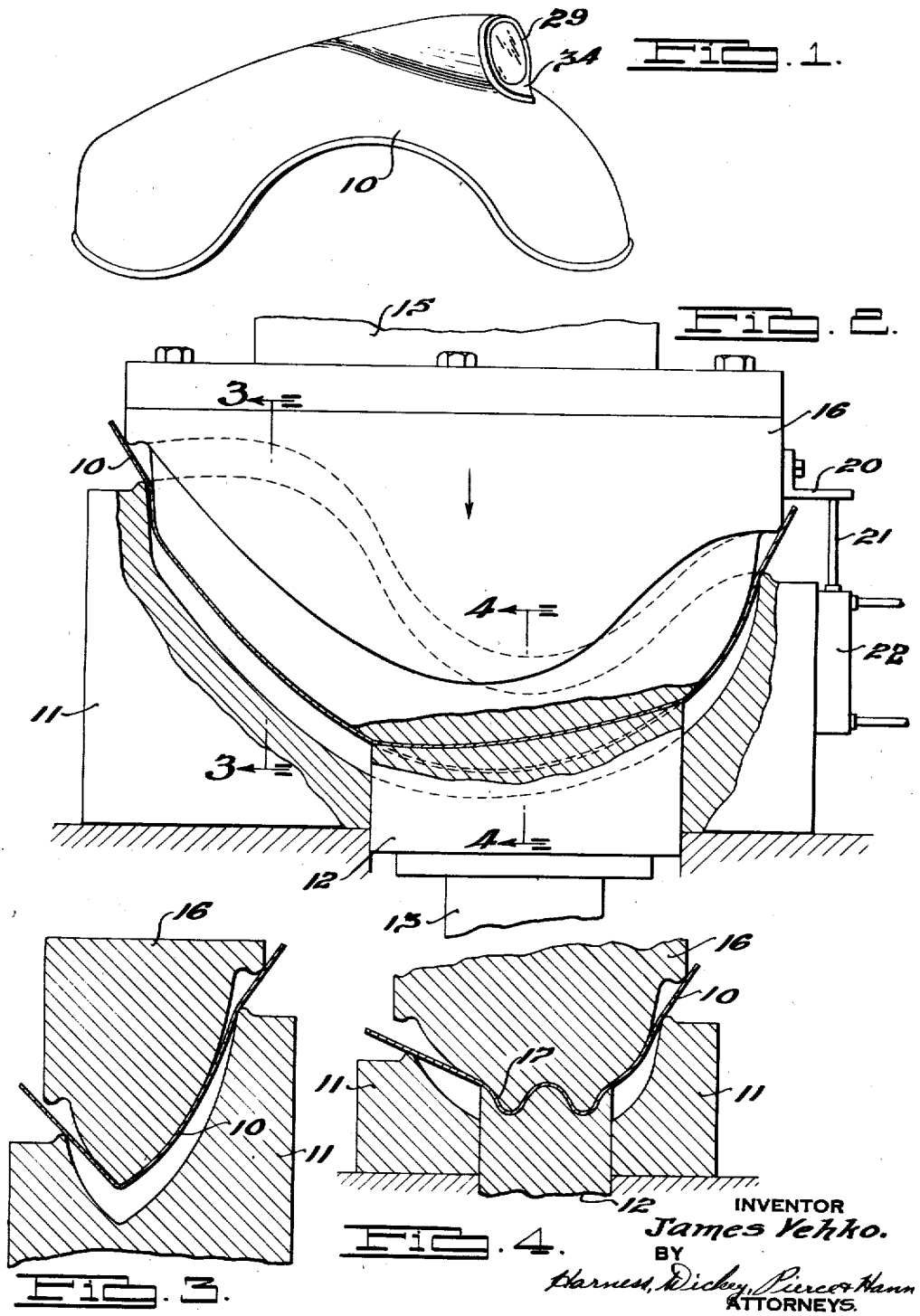

July 18, 1939.  J. VEHKO  2,166,226
METHOD OF PRODUCING STAMPINGS
Filed March 11, 1936   3 Sheets-Sheet 3
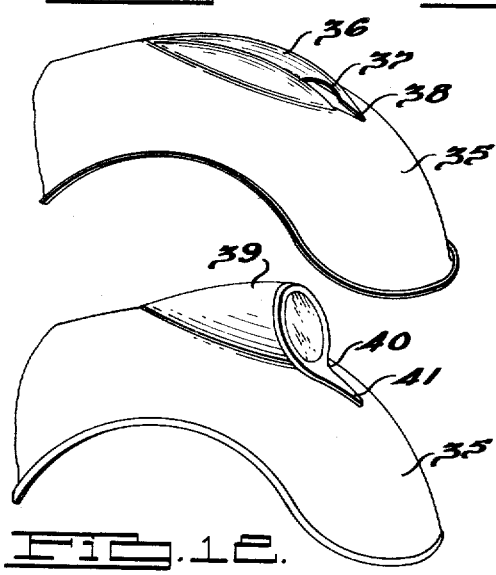
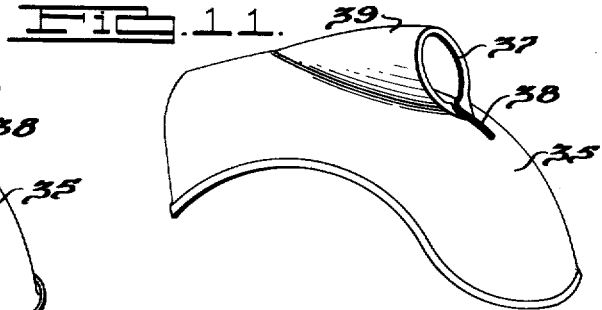
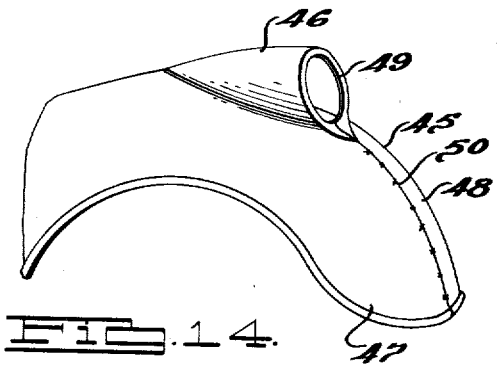
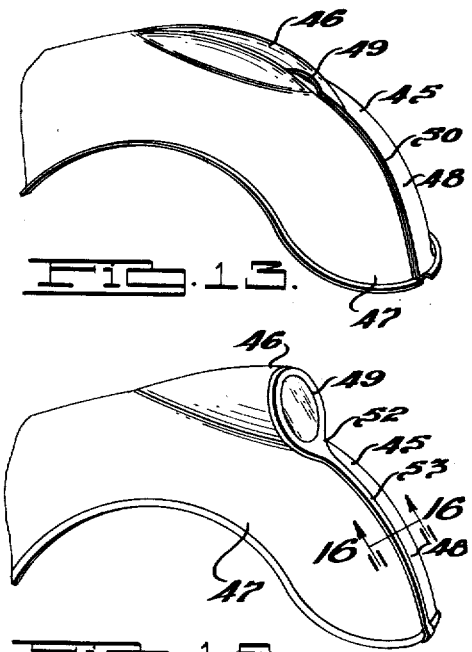
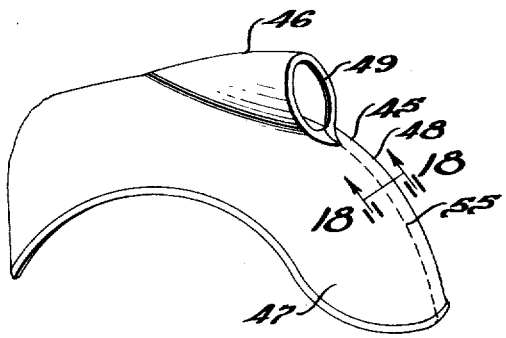
INVENTOR
James Vehko.
BY
Harness, Dickey, Pierce & Hann.
ATTORNEYS.

Patented July 18, 1939

2,166,226

UNITED STATES PATENT OFFICE 2,166,226

METHOD OF PRODUCING STAMPINGS

James Vehko, Detroit, Mich., assignor to The Murray Corporation of America, a corporation of Delaware Application March 11, 1936, Serial No. 68,173

10 Claims. (Cl. 113—116)

This invention relates to deep drawn sheet metal stampings. More particularly it relates to a novel method of forming deep drawn sheet metal stampings, in which certain novel method steps contribute to provide an excess of metal at the deepest part of the draw.

While it will become clear from the following description that the specific embodiment of the invention illustrated in the accompanying drawings is directed specifically to a novel method of forming fenders for automotive vehicles which have a headlight housing formed as an integral part of the fender, the generic inventive concept presented herein will find broad and practical utility in many and various fields.

The present day trend of automobile design has required the provision of automotive vehicle fenders with relatively wide skirt portions, necessitating an exceptionally deep draw in the formation of the fender. The present invention relates to a construction in which a fender requiring an exceptionally deep draw in the crown portion has an integrally formed headlight housing requiring a further drawing of the metal from which the fender is made.

It is a general object of the present invention to provide a method for forming automotive vehicle fenders having head lamp housings located in the crown portion thereof, and formed as an integral part of the fender construction.

The present invention contemplates the provision of a method of forming fenders of this character, which method contemplates the utilization of certain novel method steps which provide an accumulation of excess metal from which the headlight housing may be formed after the fender has been stamped to the desired configuration.

The present invention contemplates the provision of a method in which a predetermined portion of the blank is substantially deformed in its central portion to provide an excess of metal in this area prior to the stamping of the fender. The fender is then stamped to form, at the same time retaining this deformed area in deformed condition, in order to maintain the desired excess of metal. After the fender has been stamped to final form, the headlight housing is stamped to form from the deformed portion of the blank, and it will be clear that the excess metal accumulated in this portion of the blank will be ample for the purpose of forming this headlight housing without subjecting the blank as a whole to unnecessary strain.

By way of modification, the present invention contemplates the formation of a fender stamping having an area in the crown portion thereof deformed prior to the formation of the body portion of the stamping to provide excess metal for the formation of a headlight housing. After the fender has been stamped to substantially its final form, the front portion of the fender is slotted, a strip of metal removed therefrom and the edges on either side of this slot are then drawn together to provide additional excess metal for the formation of the head lamp housing.

Many other and further objects and advantages of the present invention will become clearly apparent from the following specification when considered in connection with the accompanying drawings forming a part thereof.

In the drawings:

Figure 1 represents an automobile fender manufactured in accordance with the method of the present invention;

Figure 2 is a side elevational view with parts in section, illustrating a pair of dies suitable for use in connection with the present method, showing the first operation in the formation of the improved fender construction.

Figure 3 is a vertical transverse sectional view taken substantially on the line 3—3 of Figure 2, illustrating the inter-engaging dies which serve to shape the body portion of the fender.

Figure 4 is a transverse sectional view taken substantially on the line 4—4 of Figure 2, illustrating the auxiliary die sections, which are utilized for the purpose of deforming a portion of the blank prior to the formation of the fender.

Figure 5 is a vertical transverse sectional view similar to Figure 4, illustrating the dies completely engaged to form the body portion of the fender to shape.

Figure 6 is a transverse sectional view through the dies utilized for the purpose of further deforming the deformed area of the fender to provide the required metal for the formation of the head lamp housing.

Figure 7 is a transverse sectional view, similar to Figure 6, illustrating the dies utilized for providing the final forming operation of the head lamp housing.

Figure 8 is a longitudinal sectional view taken substantially on the line 8—8 of Figure 7 with parts broken away illustrating the shape of the dies utilized in the final forming operation of the head lamp housing.

Figure 9 is a side perspective view of the completed fender construction after the headlight housing has been punched to provide the necessary frontal opening therein.

Figure 10 is a perspective view of a fender blank in which novel and different means are utilized in addition to those shown in the previous figures for providing excess metal for forming the headlight housing.

Figure 11 illustrates a completely formed fender manufactured in accordance with this modified form of the invention.

Figure 12 shows the fender construction illustrated in Figures 10 and 11 after the decorative trim has been applied to the headlight housing.

Figure 13 illustrates a partially formed blank embodying a still further modified form of the invention.

Figure 14 illustrates in perspective the completely formed fender manufactured from the partially formed blank shown in Figure 13.

Figure 15 illustrates in perspective the fender construction shown in Figure 14 with the decorative trim material applied thereto.

Figure 16 is an enlarged transverse sectional view taken substantially on the line 16—16 of Figure 15 illustrating in detail the joint interconnecting the front portions of the fender.

Figure 17 illustrates in perspective a still further modified form of the invention utilizing substantially the same steps of manufacture as the modified form of the invention shown in Figure 13.

Figure 18 is an enlarged transverse sectional view taken substantially on the line 18—18 of Figure 17 illustrating the modified form of joint interconnecting the front portions of the fender.

With more particular reference to the drawings and specifically to the form of the invention illustrated in Figures 1 to 9, inclusive, it will be seen that the improved fender construction is formed from a blank 10 of sheet metal of suitable gauge which is placed in a suitable stationary die 11 having a configuration substantially that of the fender which it is desired to produce. This die member 11 has a movable die section in the central portion thereof which, as will hereinafter be seen, is adapted to preliminarily preform the blank 10 to provide excess metal for the subsequent formation of the headlight housing. This auxiliary die 12 is actuated by means of a vertically movable push rod 13 from a suitable hydraulic cylinder such as is conventional in die structures of this kind. The ram 15 of the die press has secured thereto a die 16 which has a central portion 17 adapted to mate with the face of the auxiliary die 12 and gather excess metal to be utilized, as subsequently explained, in the formation of the integrally formed headlight housing in the fender.

The remainder of the die 16 is of a configuration adapted to mate with the die 11 and form the body portion of the fender.

In operation of the press, the blank 10 of suitable sheet metal is placed on the die 11 and the auxiliary die 12 is moved upwardly to meet the downwardly moving die 16, in order to deform and gather a substantial amount of metal in the central portion of the blank prior to final forming of the body portion of the fender as a whole. It will be seen by reference to Figure 2 that the auxiliary die 12 meets and mates with the central portion of the downwardly moving die 16 prior to the interengagement of the dies 16 and 11. These dies serve to corrugate or otherwise deform the central portion of the blank prior to the formation of the body portion of the fender. It will be seen by reference to Figure 2 that as the die 16 moves downwardly to the point where it has completed the deforming operation of the central portion of the blank, a bracket 20 serves to engage a push rod 21 actuating a valve 22, which serves to relieve fluid pressure from the hydraulic cylinder operating the push rod 13 and die 12, in order to permit this auxiliary die to move downwardly with the die 16 during the final forming operation of the body portion of the fender. The manner in which the body portion of the fender is completely formed and the dies in their final position of this forming operation are clearly seen in the sectional view Figure 5.

After the completion of this operation, the blank 10 is removed and placed between a second pair of dies 25 and 26, which serve to retain the body portion of the fender in its predetermined formed condition during a subsequent deforming operation of the central portion thereof. The die 25 has mounted therein an independently movable auxiliary die 27 which serves to mate with a recess 28 of suitable configuration in the central portion of the upper die 26. Movement of this auxiliary die 27 into engagement with the recess 28 serves to deform the central portion of the blank 10 and draw the metal thereof upwardly at the sides of the headlight housing and it will be clearly seen by reference to Figure 6 that during this operation the dies 25 and 26 serve to retain the body portion of the fender in substantially predetermined configuration.

After completion of this deforming operation, the blank is removed from the dies 25 and 26 and placed in a separate set of dies 30 and 31. The die 30 has an independently movable member 32 in its central portion, which mates with a suitable recess 33 in the central portion of the die 31. The dies 31 and 30 are of a configuration such that they serve to retain the body portion of the fender in its finally finished configuration during the formation of the central portion thereof to the finally desired form. It will be seen by reference to Figures 7 and 8 that the die 32 and recess 33 in the die 31 with which it mates are of such configuration that they serve to shape the central portion of the blank 10 to provide an upraised headlight housing in the central portion of the fender of predetermined desired configuration.

After the completion of this operation, a suitable circular frontal opening may be punched in the headlight housing and the marginal edges of the blank trimmed to provide a fender substantially of the construction illustrated in Figure 9.

It will be appreciated from the foregoing that the method disclosed above serves to accumulate a rather substantial amount of metal in the central portion of the blank and retain this metal in predetermined form during the drawing of the body portion of the fender. After the body portion of the fender has been formed, the body portion thereof is clamped between dies to retain it in predetermined form during the formation of the headlight housing in the central portion thereof. It will be appreciated that the excess metal accumulated in the central portion of the fender serves to provide material from which the headlight housing may be subsequently formed without subjecting the body portion of the fender to strain during this last forming operation.

It has been found that the above outlined method provides a fender construction with a headlight housing therein in which the thickness and strength characteristics of the resultant product are substantially uniform throughout, irrespective of the fact that the draw as a whole is a relatively deep one.

In the modified form of the invention illustrated in Figures 10 to 12, inclusive, it will be appreciated that additional means are provided for making available excess metal from which the headlight housing in the central portion of the fender construction may be formed. In this form of the invention, a blank 35 has the central portion 36 thereof deformed substantially as has been described above prior to the drawing of the body portion of the fender to the desired final configuration. As has been described above, this central portion 36 is retained in deformed condition during the formation of the body portion of the fender as a whole to make available excess metal for the formation of the headlight housing in the manner hereinafter described.

In this form of the method of the present invention, prior to the further deformation of the central portion 36 of the blank, a suitable hole 37 is formed therein and at the same time a forwardly extending V-shaped slot 38 is formed, the mouth of which slot communicates with the hole 37. The blank is then placed in suitable dies which shape the central portion 36 of the blank to provide the headlight housing 39 in substantially final form and during which forming operation the metal is drawn inwardly from the sides in such a manner that the V-shaped slot 38 is closed and the edges thereof brought into substantially abutting relation as is shown in Figure 11. This drawing in of the metal from the sides, which results in the closing of the V-shaped slot 38, serves to make available additional metal for the formation of the head lamp housing 39 and contributes with the excess metal provided in the deformed portion 36 of the blank to provide sufficient metal for the headlight housing as a whole. It will be appreciated that in this form of the invention sufficient excess metal is made available due to the drawing in from the sides to eliminate the second deforming operation shown in Figure 6 in connection with the preferred embodiment of the invention, if desired.

After the fender construction has been stamped to form substantially as is shown in Figure 11, a finish moulding 40 may be applied to the face of the opening in the headlight housing, and as seen in Figure 12 this finish moulding may be provided with a forwardly projecting ornamental portion 41 which serves to cover and hide the slot 38 extending forwardly from the headlight opening.

In the modified form of the invention illustrated in Figures 13 to 16, inclusive, it will be appreciated that many of the advantages and steps of the methods described above are utilized therein. In this form of the invention, a blank 45 first has the central portions 46 thereof deformed to provide excess metal for the formation of the headlight housing. Subsequently this blank is shaped to provide a fender construction in which the forward portion thereof comprises two sections 47 and 48, which have a strip of waste metal therebetween. A suitable hole 49 is cut in the deformed portion 46 of the blank and the waste metal between the sections 47 and 48 of the front portion of the fender is removed to provide a forwardly extending slot 50, which communicates with the openings 49. The blank is then placed in suitable dies which serve to shape the central portion 46 thereof to final form and at the same time move the side portions 47 and 48 towards each other to arrange their edges in substantially overlapping relation. It will be seen that this movement of the sections 47 and 48 toward each other serves to make excess metal available for the formation of the headlight housing in the central portion of the blank. The adjacent edges of the sections 47 and 48 may be spot welded or otherwise secured together and the fender structure as a whole is finished by the application of a suitable moulding 52 which has formed as an integral part thereof a forwardly extending strip 53 which serves to hide the seam joining the sections 47 and 48 in the front portion of the fender.

In the modified form of the invention illustrated in Figures 17 and 18, substantially the same method steps are followed as has been described in the modified form of the method shown in Figures 13 to 16, inclusive. However, in this form of the invention, the final operation which serves to form the headlight housing also serves to move the sections 47 and 48 of the front portion of the fender into abutting relation and these two edges may be butt welded together and dressed down in order to provide an invisible seam 55 therebetween, thus eliminating the necessity of the type of finish moulding illustrated in Figure 15. It will be appreciated that in this form of the invention, the finally completed fender construction will have an exterior appearance substantially as is shown in Figure 1.

From the foregoing it will be appreciated that the above described method is merely illustrative of the generic inventive concept presented in this application and that many other and further modifications thereof falling within the scope of the invention as defined in the appended claims will be clearly apparent to those skilled in the art.

What is claimed is:

1. The method of forming a vehicle fender and headlight housing from an integral sheet metal blank which includes deforming a portion of said blank, stamping the remainder of said blank to form the fender, the while retaining said deformed portion in deformed condition, and subsequently stamping said deformed portion to provide a headlight housing.

2. The method of forming a vehicle fender and headlight housing from an integral sheet metal blank which includes deforming a portion of said blank, stamping the remainder of said blank to form the fender, the while retaining said deformed portion in deformed condition, and subsequently stamping said deformed portion to provide a headlight housing the while retaining the body portion of said blank in substantially final configuration.

3. The method of forming a deep drawn sheet metal stamping which comprises gathering a portion thereof to provide excess metal therein, stamping the remainder of said blank to final form, the while retaining said gathered portion in deformed condition, and subsequently stamping said gathered portion to final form, at the same time retaining the remainder of the blank in formed condition.

4. The method of forming a vehicle fender and headlight housing from an integral sheet metal blank which includes deforming a portion of said blank, stamping the fender to final form the while retaining said deformed portion in deformed condition, further deforming the deformed portion of the blank the while retaining the fender in formed condition and finally forming said deformed portion to provide a headlight housing.

5. The method of forming a vehicle fender and headlight housing from an integral sheet metal blank which includes gathering a portion of said blank to provide excess metal for the headlight housing, removing metal from said blank to provide a slot extending forwardly from said deformed area, stamping said gathered area to form the headlight housing to substantially final form at the same time drawing the walls of said slot together, and securing the walls of said slot together in abutting relation.

6. The method of forming a vehicle fender and headlight housing from an integral sheet metal blank which includes gathering a portion of said blank to provide excess metal for the headlight housing, stamping the body portion of the fender to substantially final form, forming a slot in said fender between the gathered portion thereof and the front portion thereof to remove metal from the front portion of said fender, stamping the gathered portion of said blank to form a headlight housing at the same time drawing the edges of said slot into overlapping relation, securing said edges in overlapping relation.

7. The method of forming a vehicle fender and headlight housing from an integral sheet metal blank which includes gathering a portion of said blank to provide excess metal for the headlight housing, stamping the body portion of said fender to substantially final form, removing a strip of metal to provide a slot extending from the gathered area to the front of said fender, stamping the gathered portion of said blank to form a headlight housing and at the same time drawing the edges of said slot into abutting relation, and securing the edges of said slot in abutting relation to provide the front portion of said fender.

8. The method of forming a vehicle fender and headlight housing from an integral sheet metal blank which includes gathering a portion of said blank to provide excess metal for the headlight housing, gripping said gathered portion to retain the same in predetermined condition during a subsequent operation, stamping the fender to form and subsequently stamping the gathered portion of the blank to provide a headlight housing.

9. The method of forming a vehicle fender and headlight housing from an integral sheet metal blank which includes gathering a portion of said blank to provide excess metal for the headlight housing, gripping said gathered portion to retain the same in predetermined condition during a subsequent operation, stamping the fender to form, forming the gathered portion of said blank to provide the headlight housing and punching a frontal opening therein.

10. The method of forming a vehicle fender and head lamp housing from an integral sheet metal blank which includes gathering a portion of said blank to provide excess metal for the headlight housing, gripping said gathered portion to retain the same in predetermined condition during a subsequent operation, stamping the body portion of the fender to final form, retaining the body portion of the fender in substantially final form and simultaneously forming the gathered portion of said blank to provide the headlight housing.

JAMES VEHKO.

---

CERTIFICATE OF CORRECTION.

Patent No. 2,166,226.     July 18, 1939.

JAMES VEHKO.

It is hereby certified that error appears in the printed specification of the above numbered patent requiring correction as follows: Page 4, first column, line 7, claim 5, for the word "deformed" read gathered; and that the said Letters Patent should be read with this correction therein that the same may conform to the record of the case in the Patent Office.

Signed and sealed this 19th day of September, A. D. 1939.

(Seal)

Henry Van Arsdale,
Acting Commissioner of Patents.

5. The method of forming a vehicle fender and headlight housing from an integral sheet metal blank which includes gathering a portion of said blank to provide excess metal for the headlight housing, removing metal from said blank to provide a slot extending forwardly from said deformed area, stamping said gathered area to form the headlight housing to substantially final form at the same time drawing the walls of said slot together, and securing the walls of said slot together in abutting relation.

6. The method of forming a vehicle fender and headlight housing from an integral sheet metal blank which includes gathering a portion of said blank to provide excess metal for the headlight housing, stamping the body portion of the fender to substantially final form, forming a slot in said fender between the gathered portion thereof and the front portion thereof to remove metal from the front portion of said fender, stamping the gathered portion of said blank to form a headlight housing at the same time drawing the edges of said slot into overlapping relation, securing said edges in overlapping relation.

7. The method of forming a vehicle fender and headlight housing from an integral sheet metal blank which includes gathering a portion of said blank to provide excess metal for the headlight housing, stamping the body portion of said fender to substantially final form, removing a strip of metal to provide a slot extending from the gathered area to the front of said fender, stamping the gathered portion of said blank to form a headlight housing and at the same time drawing the edges of said slot into abutting relation, and securing the edges of said slot in abutting relation to provide the front portion of said fender.

8. The method of forming a vehicle fender and headlight housing from an integral sheet metal blank which includes gathering a portion of said blank to provide excess metal for the headlight housing, gripping said gathered portion to retain the same in predetermined condition during a subsequent operation, stamping the fender to form and subsequently stamping the gathered portion of the blank to provide a headlight housing.

9. The method of forming a vehicle fender and headlight housing from an integral sheet metal blank which includes gathering a portion of said blank to provide excess metal for the headlight housing, gripping said gathered portion to retain the same in predetermined condition during a subsequent operation, stamping the fender to form, forming the gathered portion of said blank to provide the headlight housing and punching a frontal opening therein.

10. The method of forming a vehicle fender and head lamp housing from an integral sheet metal blank which includes gathering a portion of said blank to provide excess metal for the headlight housing, gripping said gathered portion to retain the same in predetermined condition during a subsequent operation, stamping the body portion of the fender to final form, retaining the body portion of the fender in substantially final form and simultaneously forming the gathered portion of said blank to provide the headlight housing.

JAMES VEHKO.

---

CERTIFICATE OF CORRECTION.

Patent No. 2,166,226.  July 18, 1939.

JAMES VEHKO.

It is hereby certified that error appears in the printed specification of the above numbered patent requiring correction as follows: Page 4, first column, line 7, claim 5, for the word "deformed" read gathered; and that the said Letters Patent should be read with this correction therein that the same may conform to the record of the case in the Patent Office.

Signed and sealed this 19th day of September, A. D. 1939.

(Seal)

Henry Van Arsdale,
Acting Commissioner of Patents.